United States Patent
Gupta et al.

(10) Patent No.: US 10,780,802 B2
(45) Date of Patent: Sep. 22, 2020

(54) SEATING ASSEMBLY

(71) Applicant: Ford Global Technologies, LLC, Dearborn, MI (US)

(72) Inventors: N. R. Adarsh Gupta, Southgate, MI (US); George Jacob, Troy, MI (US); Robert J. Sack, II, Commerce Charter Township, MI (US); Travis Pierce, Ferndale, MI (US); Craig Rackers, Troy, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/276,886

(22) Filed: Feb. 15, 2019

(65) Prior Publication Data

US 2020/0262322 A1    Aug. 20, 2020

(51) Int. Cl.
*B60N 2/427* (2006.01)
*B60N 2/68* (2006.01)
*B60N 2/02* (2006.01)

(52) U.S. Cl.
CPC .......... *B60N 2/42709* (2013.01); *B60N 2/02* (2013.01); *B60N 2/682* (2013.01)

(58) Field of Classification Search
CPC ............................. B60N 2/42709; B60N 2/682
See application file for complete search history.

(56) References Cited

U.S. PATENT DOCUMENTS

| | | | |
|---|---|---|---|
| 6,709,053 B1 * | 3/2004 | Humer | B60N 2/4228 297/216.1 |
| 7,281,766 B2 | 10/2007 | Fujita et al. | |
| 8,052,195 B2 * | 11/2011 | Aufrere | B60N 2/015 188/376 |
| 8,210,606 B2 * | 7/2012 | Meghira | B60N 2/42709 297/216.1 |
| 8,967,663 B2 * | 3/2015 | Seki | B60N 2/4228 280/730.2 |
| 9,387,783 B2 * | 7/2016 | Munemura | B60N 2/4228 |
| 10,518,663 B1 * | 12/2019 | Kakishima | B60N 2/12 |
| 2008/0315635 A1 | 12/2008 | Kimura et al. | |
| 2018/0009342 A1 * | 1/2018 | Meng | B60N 2/42709 |
| 2019/0143855 A1 * | 5/2019 | Young | B60N 2/4221 |
| 2019/0322372 A1 * | 10/2019 | Hoover | B60N 2/42736 |

FOREIGN PATENT DOCUMENTS

| | | | | |
|---|---|---|---|---|
| DE | 19807581 A1 * | 9/1998 | ......... | B60N 2/42709 |
| DE | 10041655 A1 * | 3/2002 | ............ | B60N 2/682 |
| DE | 102014004440 A1 * | 9/2014 | ......... | B60N 2/42745 |
| EP | 1547857 A2 * | 6/2005 | ............. | B60N 2/682 |
| EP | 3434512 A1 * | 1/2019 | .......... | B60N 2/42781 |
| GB | 2421277 A | 6/2006 | | |

(Continued)

*Primary Examiner* — Timothy J Brindley
(74) *Attorney, Agent, or Firm* — David Coppiellie; Price Heneveld LLP (57) ABSTRACT

A vehicle includes a vehicle seating assembly including a seat back and a seat base. A bracket couples the seat base to the seat back, wherein the bracket defines an opening. A fastener retains the bracket to the seat base via the opening. A deformable spacer is positioned about the fastener and within the opening. The deformable spacer is configured to deform in response to a pre-determined force.

20 Claims, 7 Drawing Sheets

(56) References Cited

FOREIGN PATENT DOCUMENTS

| WO | WO-2009080973 A2 * | 7/2009 | ........... B60N 2/4214 |
| WO | 2010002327 A1 | 1/2010 | |
| WO | WO-2012013371 A1 * | 2/2012 | ............... B60N 2/02 |
| WO | WO-2017137102 A1 * | 8/2017 | ......... B60N 2/42736 |
| WO | WO-2018215395 A1 * | 11/2018 | ............... B60N 2/22 |

\* cited by examiner

SEATING ASSEMBLY

FIELD OF THE DISCLOSURE

The present disclosure generally relates to a seating assembly. More specifically, the present disclosure relates to a vehicle seating assembly having a deformable spacer.

BACKGROUND OF THE DISCLOSURE

Vehicle seats often have a welded nut-and-bolt assembly to form a rigid joint for the seat. However, the vehicle seats with welded nut-and-bolt assemblies often transfer force from a vehicle impact or other vehicle maneuver to an occupant.

SUMMARY OF THE DISCLOSURE

According to at least one aspect of the present disclosure, a vehicle includes a vehicle seating assembly including a seat back and a seat base. A bracket couples the seat base to the seat back, wherein the bracket defines an opening. A fastener retains the bracket to the seat base via the opening. A deformable spacer is positioned about the fastener and within the opening. The deformable spacer is configured to deform in response to a pre-determined force.

According to another aspect of the present disclosure, a vehicle seating assembly includes a seat back and a seat base coupled to the seat back via a bracket. A fastener retains the bracket to the seat base. A deformable spacer is positioned about the fastener. The deformable spacer includes a projection extending radially outwards from an outer wall.

According to another aspect of the present disclosure, a vehicle seating assembly includes a seat back and a seat base coupled to the seat back via a bracket. A fastener retains the bracket to the seat base. A deformable spacer is positioned about a perimeter of the fastener. The deformable spacer defines an interior channel and an inner aperture.

These and other aspects, objects, and features of the present disclosure will be understood and appreciated by those skilled in the art upon studying the following specification, claims, and appended drawings.

BRIEF DESCRIPTION OF THE DRAWINGS

The following is a description of the figures in the accompanying drawings. The figures are not necessarily to scale, and certain features and certain views of the figures may be shown exaggerated in scale or in schematic in the interest of clarity and conciseness.

In the drawings.

DETAILED DESCRIPTION

Additional features and advantages of the invention will be set forth in the detailed description which follows and will be apparent to those skilled in the art from the description, or recognized by practicing the invention as described in the following description, together with the claims and appended drawings.

Figure 1:
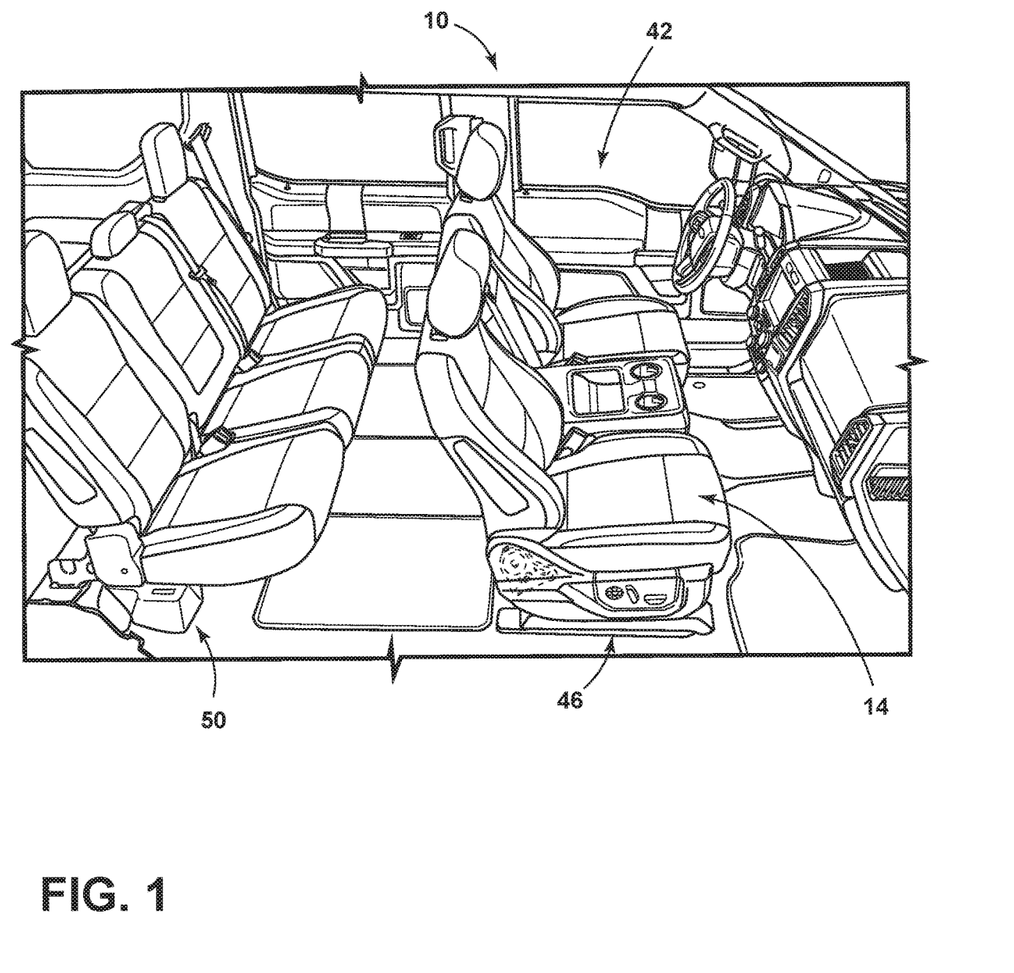
FIG. 1 is a side perspective view of an interior of a vehicle, according to at least one example.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Referring to FIGS. 1-8B, reference numeral 10 generally designates a vehicle including a vehicle seating assembly 14. The vehicle seating assembly 14 includes a seat back 18 and a seat base 22. A bracket 26 couples the seat base 22 to the seat back 18 and defines at least one opening 30. A fastener 34 retains the bracket 26 to the seat base 22 via the opening 30. A deformable spacer 38 is positioned about the fastener 34 and is configured to deform in response to a pre-determined force.

Referring to FIG. 1, a passenger area 42 of the vehicle 10 is shown having a first seating row 46 and a second seating row 50. The first seating row 46 is positioned in a vehicle-forward direction of the second seating row 50. As illustrated, the first seating row 46 includes two seating assemblies 14, such as, for example, driver and adjacent passenger vehicle seating assemblies. The seating assembly 14 may also be installed within the second seating row 50 or another location within the vehicle 10, such as any additional seating rows. The vehicle 10 may be a manually operated vehicle (i.e., using a human driver). Additionally, or alternatively, the seating assembly 14 may be installed within an autonomous vehicle, which may result in a different configuration of the seating assemblies 14 within the vehicle 10.

Figure 2:
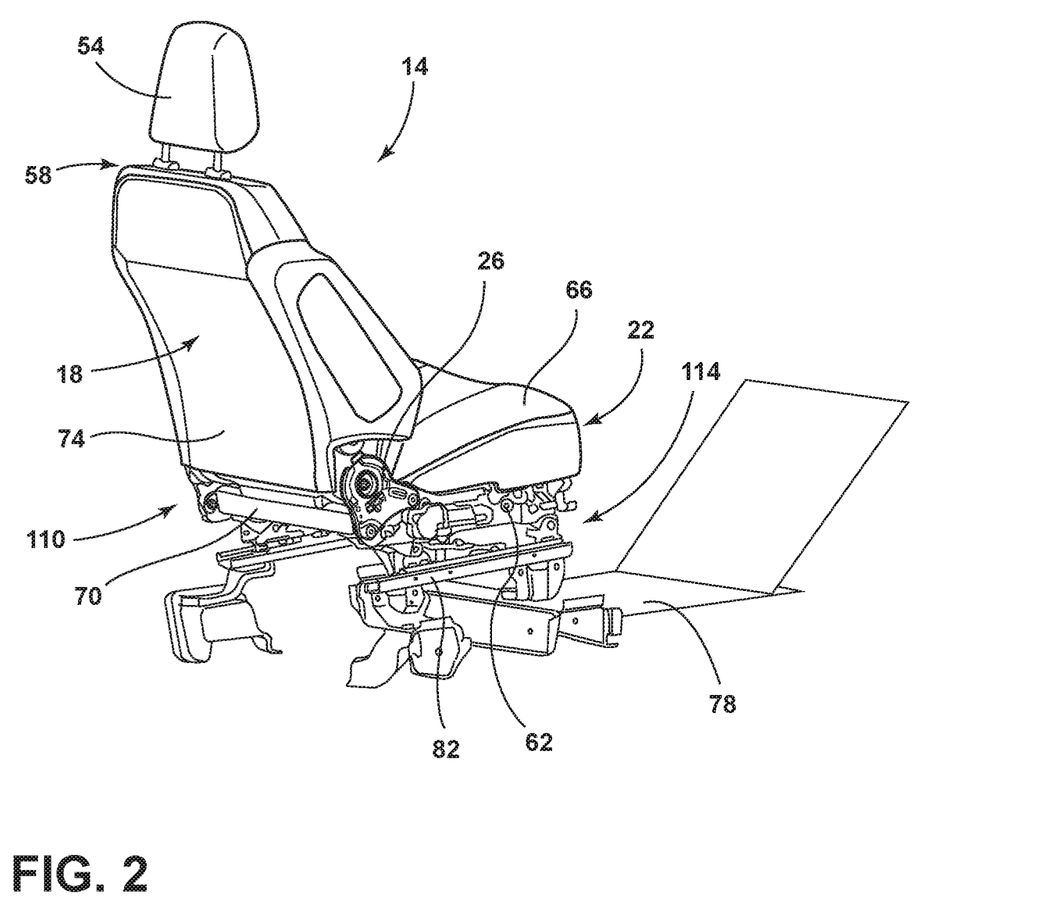
FIG. 2 is a rear perspective view of a vehicle seating assembly, according to at least one example.

Referring now to FIG. 2, the seating assembly 14 includes the seat back 18 coupled to the seat base 22. A headrest 54 is coupled to a top edge portion 58 of the seat back 18. As illustrated, the seat base 22 includes a seat base frame 62 and a seat base cushion 66 positioned about the seat base frame 62. Additionally, the seat back 18 includes a seat back frame 70 and a seat back cushion 74 positioned about the seat back frame 70. In various examples, the seating assembly 14 may be coupled to a vehicle floor 78 via guide rails 82. The guide rails 82 may allow an occupant to adjust the seating assembly 14 in the fore-aft direction of the vehicle 10.

Figure 3:
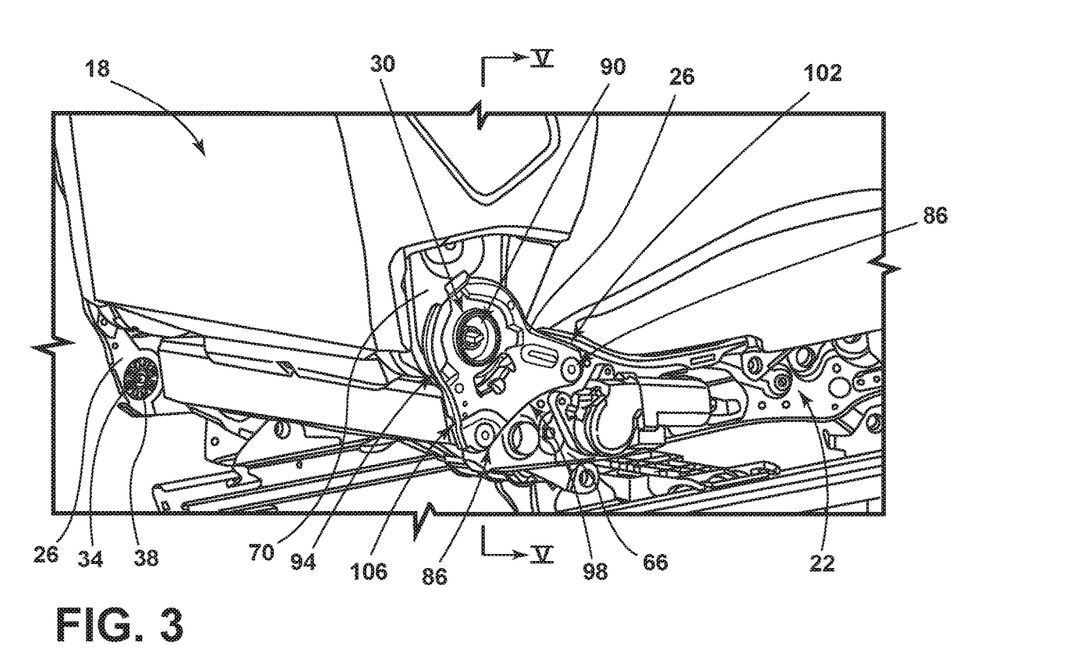
FIG. 3 is a partial rear perspective view of the vehicle seating assembly, according to at least one example.

Referring to FIGS. 2 and 3, the bracket 26 couples the seat base 22 to the seat back 18. In other words, the seat base frame 62 may be coupled to the seat back frame 70 via the bracket 26. Accordingly, the bracket 26 defines at least one opening 30. As illustrated, the bracket defines three openings 30. The bracket 26 may include two lower openings 86 proximate to the seat base 22 and an upper opening 90 proximate to the seat back 18. As such, the bracket 26 may form a bell shape or a triangular shape. In such examples, the upper opening 90 is defined by an upper portion 94 of the bracket 26 and the lower openings 86 are defined by a lower portion 98 of the bracket 26. Further, the lower openings 86 are positioned on opposing sides of the bracket 26 such that one lower opening 86 is positioned in a lower vehicle-forward portion 102 of the bracket 26 and one lower opening 86 is positioned in a lower vehicle-rearward portion 106 of the bracket 26. It is contemplated that the number of openings 30 and the shape of the bracket 26 may differ based on the model and/or size of the seating assembly 14 and/or vehicle 10.

As illustrated, each seating assembly 14 includes two brackets 26. The brackets 26 are positioned on a left side 110 and a right side 114 of the seating assembly 14, respectively. Both brackets 26 operate in the same or substantially similar manner. In other words, the brackets 26 couple the seat base 22 to the seat back 18 on each of the left and right sides 110, 114 of the seating assembly 14.

Referring to FIG. 3, in various examples, fasteners 34 retain the bracket 26 to the seat base 22 and the seat back 18 via the openings 30. In other words, the fasteners 34 extend through the openings 30 to couple and/or retain the bracket 26 to the seat back 18 and to the seat base 22. The upper opening 90 may be larger than the lower openings 86 to allow an occupant to adjust and/or recline the seat back 18. The fastener 34 may be, for example, a nut and bolt assembly, a pin, a screw, or other similar fastening members.

In various examples, the deformable spacer 38 may be positioned about the fastener 34 within the opening 30. In the depicted example, the deformable spacer 38 is positioned about the fastener 34 that extends through the lower opening 30 positioned in the lower vehicle-rearward portion 106 of the bracket 26. It may be advantageous for the deformable spacer 38 to be positioned in the lower vehicle-rearward portion 106 of the bracket 26 to provide for energy dissipation in response to a collision, hard-braking, or other maneuvers of the vehicle 10. It is contemplated that the deformable spacer 38 may be positioned elsewhere within the seating assembly 14 and/or within other openings 30 of the bracket 26 to provide for energy dissipation. It is further contemplated that the seating assembly 14 may include multiple deformable spacers 38 to increase energy dissipation. The size and shape of the deformable spacer 38 may differ based on the desired deformation of the deformable spacer 38 and/or desired deflection and/or dissipation of energy provided by the deformable spacer 38.

Figure 4A:
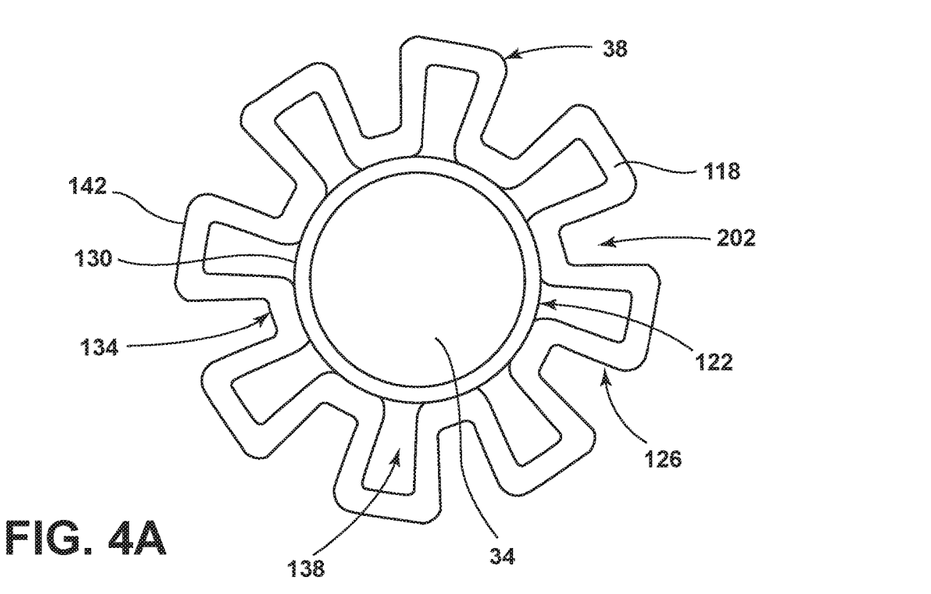
FIG. 4A is a front view of a deformable spacer positioned about a fastener, according to at least one example.

Referring to FIG. 4A, the deformable spacer 38 may be positioned about a perimeter of the fastener 34. The deformable spacer 38 includes an outer wall 118 defining an interior channel 122 for receiving the fastener 34. As illustrated in FIG. 4A, the outer wall 118 defines projections 126 extending radially outward from the interior channel 122. Accordingly, in such examples, the outer wall 118 may not continuously abut an outer surface 130 of the fastener 34. The deformable spacer 38 is illustrated having eight projections 126, however it is contemplated that the number of projections may differ based on the size and/or model of the vehicle 10 and/or the desired energy dissipation to be provided by the deformable spacer 38. The outer wall 118 may form an alternating pattern of projections 126 and abutment portions 134 where the projections 126 are spaced away from the outer surface 130 of the fastener 34 and the abutment portions 134 abut the outer surface 130 of the fastener 34. Each projection 126 may define a gap 138 with the outer surface 130 of the fastener 34. In various examples, the deformable spacer 38 may be configured to deform in response to a pre-determined force. In the example illustrated in FIG. 4A, the projections 126 may be configured to deform into the gaps 138 or may deform by folding and/or pressing laterally towards an outward surface 142 of the outer wall 118. The deformable spacer 38 may be formed from, for example, metals, metal alloys, composites, or plastics. In various examples, the deformable spacer 38 may be formed from, for example, aluminum, magnesium, or steel. It is contemplated that the deformable spacer 38 may be formed from other materials that provide sufficient rigidity to the seating assembly 14 in addition to being able to deform in response to a pre-determined force.

Figure 4B:
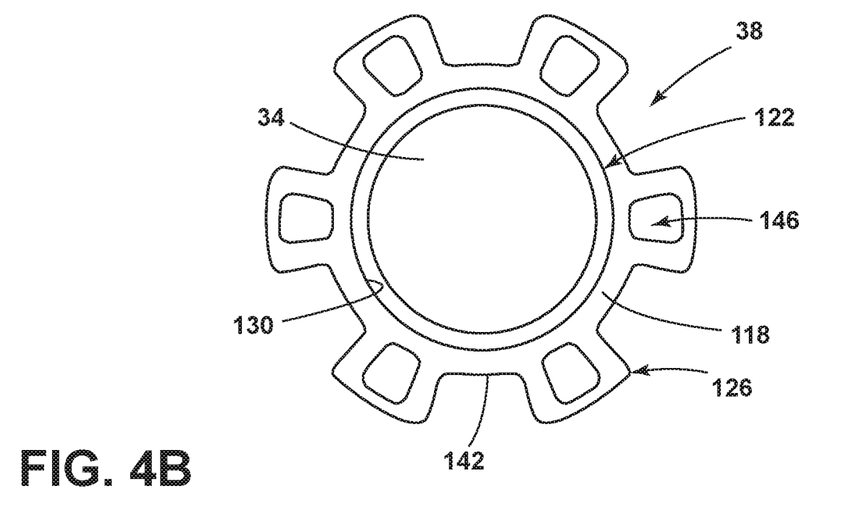
FIG. 4B is a front view of the deformable spacer, according to at least one example.

Referring to FIG. 4B, another example of the deformable spacer 38 is shown. The deformable spacer 38, as illustrated in FIG. 4B, includes the outer wall 118 defining the interior channel 122 for receiving the fastener 34. The outer wall 118 abuts the fastener 34 for the entire perimeter of the fastener 34. In other words, the outer wall 118 may continuously abut the outer surface 130 of the fastener 34. As such, the outer wall 118 may be substantially circular or oblong to correspond to the cross-sectional shape of the fastener 34. The deformable spacer 38 includes the projection 126 extending from the outer wall 118 radially outwards from the interior channel 122. As illustrated, the deformable spacer 38 includes multiple projections 126. The projections 126 may extend from the outward surface 142 of the outer wall 118. The projections 126 may be integrally formed with the outer wall 118 or may be separate components coupled to the outer wall 118. The projections 126 may extend at an angle in a range of from approximately 45° to approximately 90° relative to the outward surface 142 of the outer wall 118. In various examples, each projection 126 may also define an interior cavity 146. Additionally, the projections 126 may have a thickness around the interior cavities 146 that is substantially similar to a thickness of the outer wall 118 of the deformable spacer 38. The projections 126 may deform into the interior cavities 146 in response to the pre-determined force acting on the deformable spacer 38.

In various examples, the projections 126 may not define the interior cavities 146. The projections 126 may be a solid extension of the outer wall 118 (i.e., the projection 126 having a filled interior). The projections 126, with and/or without the interior cavities 146, may have, for example, a trapezoidal shape where a width of the projection 126 increases as the projection 126 extends away from the outer wall 118. The projections 126 may also be, for example, a substantially square or rectangular shape such that the width of the projections 126 are substantially uniform as the projections 126 extend from the outer wall 118. As previously stated, the deformable spacer 38 may include multiple projections 126 extending radially outward from the outer wall 118. The multiple projections 126 may include a range of from approximately two projections to approximately ten projections. The projections 126 may each be substantially similar in shape and/or size, may each differ in shape and/or size, or a combination thereof. As illustrated, the projections 126 are uniformly spaced apart along the outer wall 118. In other words, each projection 126 is spaced apart by a substantially uniform distance from adjacent projections 126. The uniformly-spaced projections 126 may be advantageous for providing uniform deformation among the projections 126 in response to the pre-determined force acting on the deformable spacer 38.

Figure 4C:
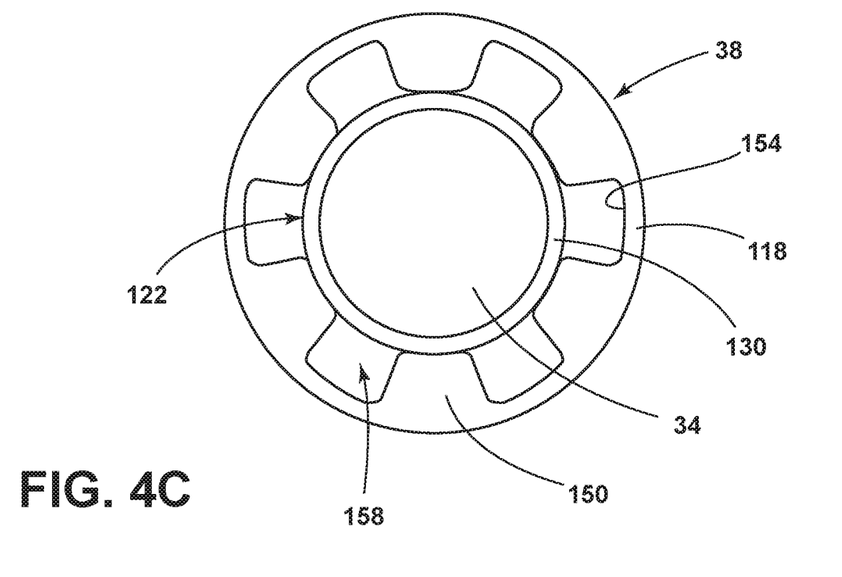
FIG. 4C is a front view of the deformable spacer, according to at least one example.

Referring to FIG. 4C, another example of the deformable spacer 38 is shown. The deformable spacer 38 includes the outer wall 118 spaced apart from the outer surface 130 of the fastener 34 by a protrusion 150. As illustrated, the deformable spacer 38 includes multiple protrusions 150. The protrusions 150 extend inwards from an interior surface 154 of the outer wall 118 of the deformable spacer 38. In other words, the outer wall 118 may have protrusions 150 extending from the interior surface 154 of the outer wall 118 into the interior channel 122. The protrusions 150 may be integrally formed with the outer wall 118 or may be separate components coupled to the outer wall 118. The protrusions 150 may have, for example, a trapezoidal shape, where a width of the protrusion 150 may decrease as the protrusions 150 extend from the outer wall 118. The protrusions 150 may also be, for example, square or rectangular shaped such that the width of the protrusions 150 are substantially uniform for the entire length of the protrusion 150. It is contemplated that the protrusions 150 may each be substantially similar in shape and/or size, may each differ in shape and/or size, or a combination thereof. Each protrusion 150 may be spaced apart from adjacent protrusions 150 by a uniform distance. The deformable spacer 38 may include multiple protrusions 150, where the multiple protrusions 150 include a range of from approximately two protrusions to approximately ten protrusions. As illustrated, the protrusions 150 do not define the interior cavity 146 (FIG. 4B). However, it is contemplated that the protrusions 150 may define the interior cavity 146. The protrusions 150 may be configured to deform in response to the pre-determined force acting on the deformable spacer 38. Additionally, the outer wall 118 may be configured to deform in response to the pre-determined force. In such examples, the outer wall 118 may deform into chambers 158 defined by adjacent protrusions 150 and/or into the interior cavities 146 (FIG. 4B) of the protrusions 150.

Figure 5:
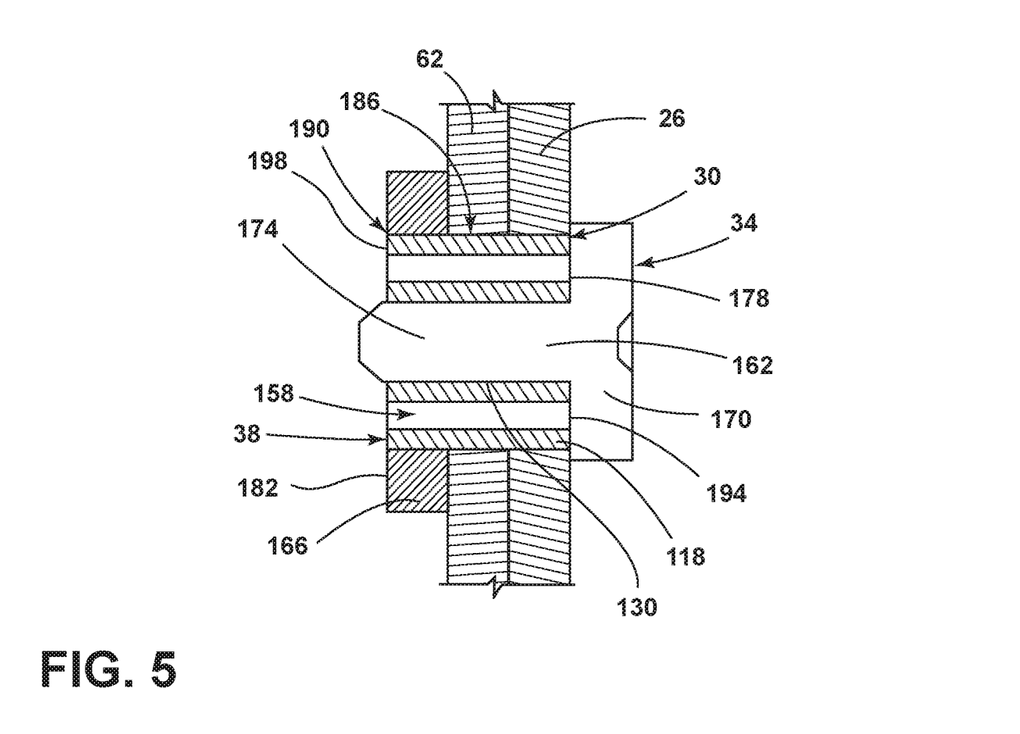
FIG. 5 is a schematic partial cross-sectional view across the line V-V of FIG. 3 of the deformable spacer and the fastener, according to at least one example.
Figure 6:
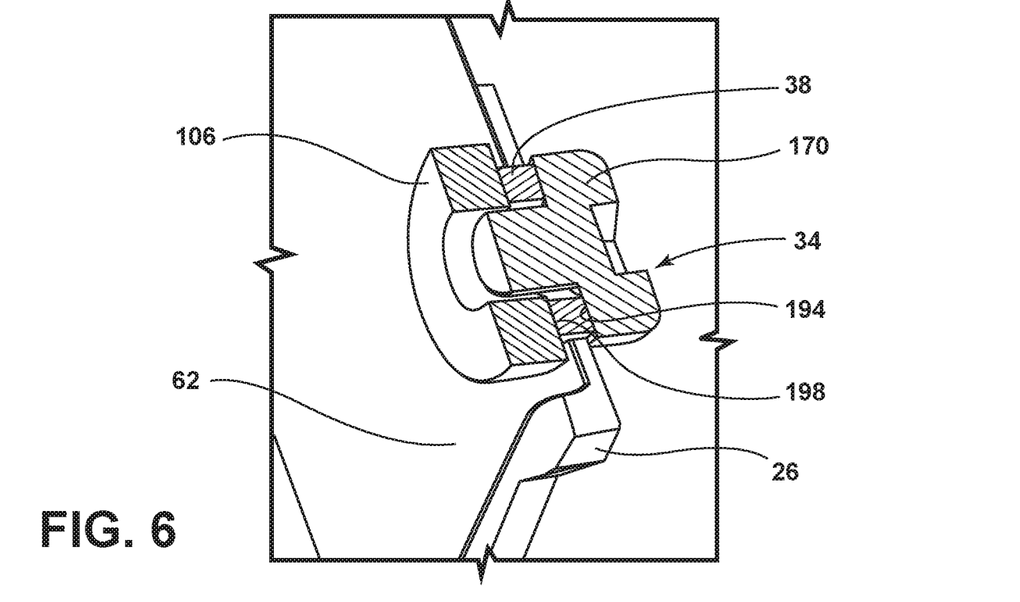
FIG. 6 is a partial cross-sectional side perspective view across the line V-V of FIG. 3 of the deformable spacer and the fastener, according to at least one example.

Referring to FIGS. 5 and 6, the fastener 34 extends through the bracket 26 and the seat base frame 62. In the depicted example, the fastener 34 includes a bolt 162 and a nut 166. A head 170 of the bolt 162 is positioned proximate the bracket 26 and the nut 166 is positioned proximate the seat base frame 62. It is contemplated that the head 170 of the bolt 162 may be positioned proximate the seat base frame 62 and the nut 166 may be positioned proximate the bracket 26. The deformable spacer 38 is positioned about a shaft 174 of the bolt 162 and abuts a bottom surface 178 of the head 170 of the bolt 162. In various examples, the deformable spacer 38 extends from the head 170 of the bolt 162 to an exterior surface 182 of the nut 166. Accordingly, the deformable spacer 38 may extend through the opening 30 defined by the bracket 26, a hole 186 defined by the seat base frame 62, and a central opening 190 of the nut 166. As such, the deformable spacer 38, as illustrated, extends a substantial portion of the length of the shaft 174 of the bolt 162. Additionally, the deformable spacer 38 is retained within the seating assembly 14 (FIG. 1) via the bolt 162 and nut 166. Additionally, where the deformable spacer 38 is positioned about the fastener 34, the bracket 26 and the seat base frame 62 may abut the outer wall 118 of the deformable spacer 38.

In the example depicted in FIGS. 5 and 6, the deformable spacer 38 includes the protrusions 150 extending towards the interior channel 122 defined by the deformable spacer 38. The protrusions 150 create the chambers 158 extending the length of the deformable spacer 38, and, therefore, extending a substantial length of the shaft 174 of the fastener 34. In other words, the chambers 158 may extend from a first surface 194 of the deformable spacer 38 to a second surface 198 of the deformable spacer. The chambers 158 may be extensions of the interior channel 122 that are defined by the outer wall 118, adjacent protrusions 150, and the outer surface 130 of the fastener 34.

Referring to FIGS. 4A-6, in examples where the deformable spacer 38 includes the projections 126, the bracket 26 and the seat base frame 62 may abut the projections 126. In such examples, tunnels 202 may be defined by the bracket 26 and/or the seat base frame 62 and adjacent projections 126. The tunnels 202 may extend from the first surface 194 of the deformable spacer 38 to the second surface 198 of the deformable spacer 38.

Figure 7:
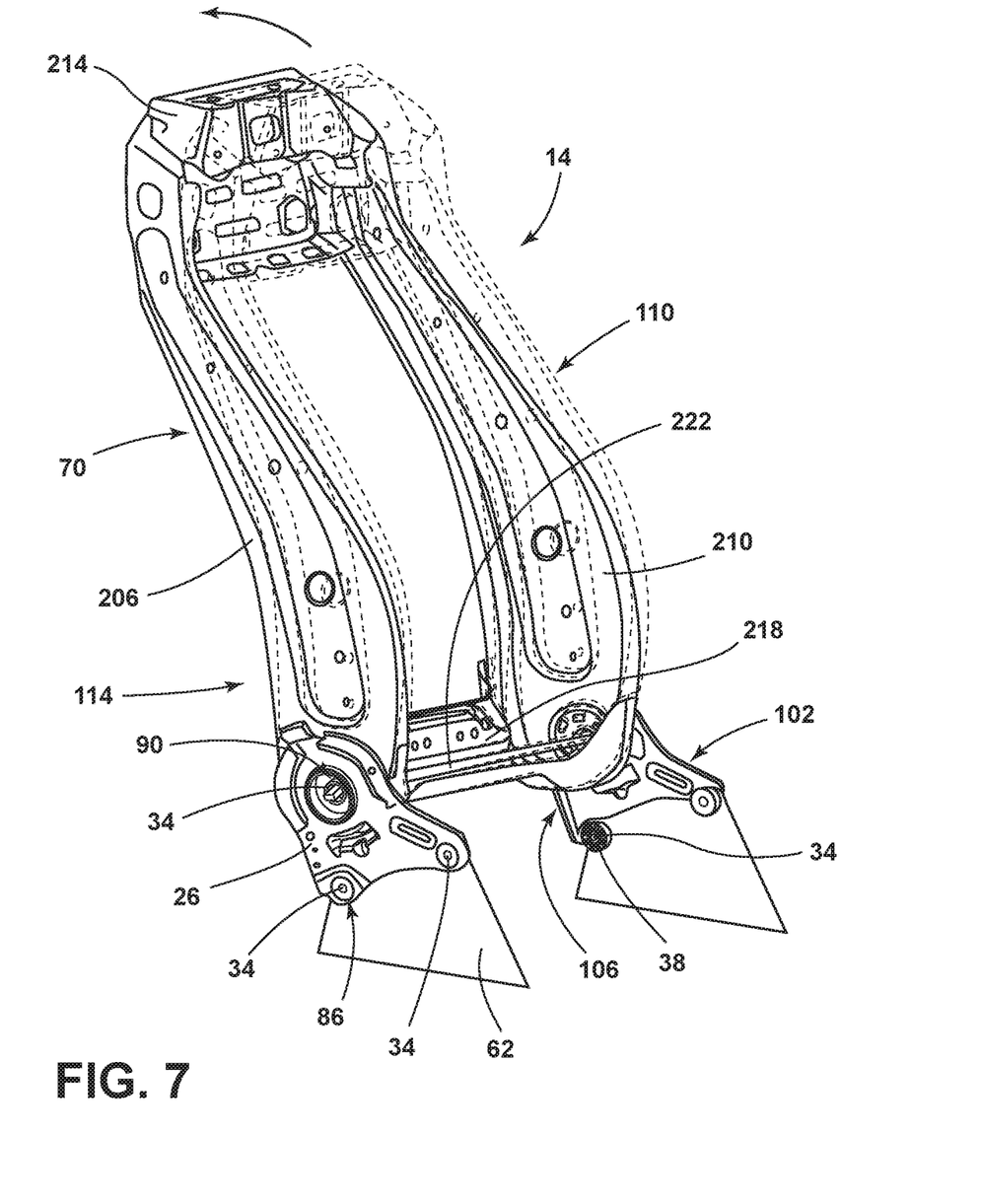
FIG. 7 is a side perspective view of a seat back from coupled to the bracket, according to at least one example.

Referring now to FIG. 7, the seat back frame 70 includes a right support 206 coupled to a left support 210 via an upper connector 214 and a lower connector 218. In the depicted example, the bracket 26 is coupled to the seat back frame 70 via one fastener 34 in the upper opening 90 of the bracket 26 and coupled to the seat base frame 62 via two fasteners 34 in the lower openings 86 of the bracket 26, respectively. In regards to the fasteners 34 coupling the bracket 26 to the seat base frame 62, one fastener 34 is positioned in the lower vehicle-forward portion 102 of the bracket 26 and one fastener 34 is positioned in the lower vehicle-rearward portion 106 of the bracket 26. The deformable spacer 38 is positioned about the fastener 34 in the lower vehicle-rearward portion 106 of the bracket 26. It is contemplated that the deformable spacer 38 may be positioned around any number and/or all of the fasteners 34 retaining the bracket 26 to the seat base 22 and/or the seat back 18.

In various examples, the upper opening 90 may be larger than the lower openings 86. The upper opening 90 may accommodate an elongated support 222 configured to allow an angle of the seat back 18 to be adjusted by an occupant. The elongated support 222 may be coupled to the upper opening 90 of the bracket 26 on the right side 114 and the upper opening 90 of the bracket 26 on the left side 110 of the seating assembly 14. The elongated support 222 may allow the seat back 18 to rotate about the upper openings 30 of the brackets 26. Additionally, the elongated support 222 may be positioned proximate the lower connector 218 of the seating assembly 14.

Figure 8A:
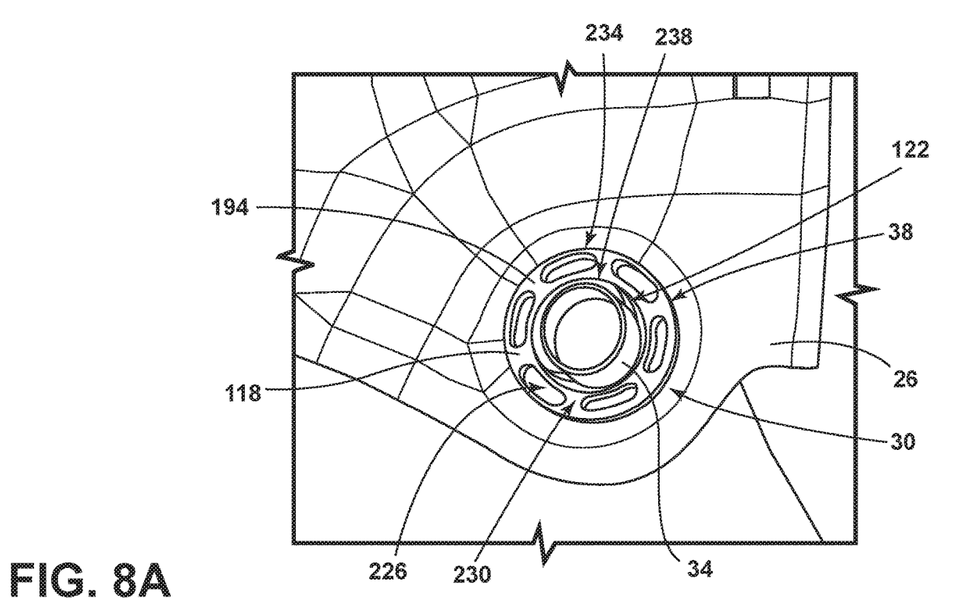
FIG. 8A is a front perspective view of the deformable bracket in a non-deformed state, according to at least one example.

Referring now to FIG. 8A, another example of the deformable spacer 38 is shown positioned within the opening 30 defined by the bracket 26. The deformable spacer 38, as depicted in FIG. 8A, includes the outer wall 118 defining the interior channel 122 for receiving the fastener 34. The outer wall 118 has a thickness greater than the thickness of the outer wall 118 in the examples depicted in FIGS. 4A-4C. Referring still to FIG. 8A, the outer wall 118 defines an inner aperture 226. The inner aperture 226 may be positioned in a center portion 230 of the outer wall 118. In other words, the deformable spacer 38 may be positioned about a perimeter of the fastener 34 and may define the interior channel 122 and the inner aperture 226. An outer portion 234 and an inner portion 238 of the outer wall 118 may cooperate to define the inner aperture 226. The outer and inner portions 234, 238 may have substantially similar thicknesses. In various examples the outer and inner portions 234, 238 of the outer wall 118 may have substantially similar thicknesses as the outer wall 118 as depicted in FIGS. 4A-4C. The deformable spacer 38 may include multiple inner apertures 226, where the multiple inner apertures 226 include a range of from approximately two inner apertures 226 to approximately ten inner apertures 226. In examples with multiple inner apertures 226, the inner apertures 226 may be spaced apart from adjacent inner apertures 226 by a uniform distance throughout the outer wall 118 of the deformable spacer 38. In other words, the inner apertures 226 may be evenly distributed about the outer wall 118. The inner apertures 226 may form an arcuate shape within the outer wall 118 such that the shape of the inner apertures 226 substantially mirrors the circular or oblong shape of the outer wall 118.

In various examples, the inner aperture 226 extends from the first surface 194 of the deformable spacer 38 to the second surface 198 of the deformable spacer 38. Accordingly, the inner apertures 226 extend the entire length of the deformable spacer 38 and, therefore, may extend a substantial length of the fastener 34. In various examples, the outer wall 118 may deform proximate the inner aperture 226 in response to the pre-determined force. In such examples, the outer portion 234 of the outer wall 118 may be configured to deform inwards into the inner aperture 226 in response to the pre-determined force.

Figure 8B:
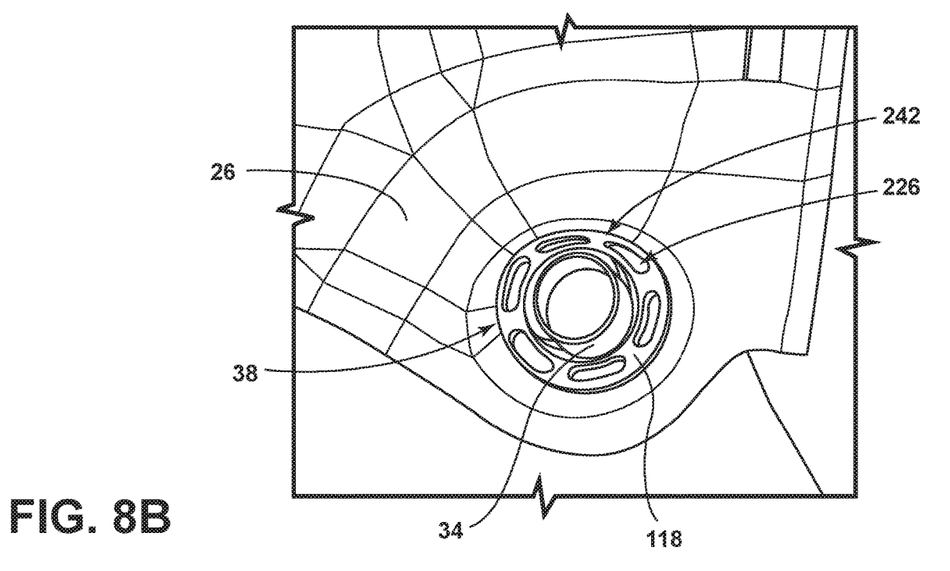
FIG. 8B is a front perspective view of the deformable bracket in a deformed state, according to at least one example.

Referring to FIGS. 7-8B, the vehicle seating assembly 14 may be installed within the vehicle 10 (FIG. 1). A force may act on the vehicle 10 and/or the seating assembly 14 during a collision, hard-braking, or other vehicle maneuvers. When the force acts on the vehicle 10 the seating assembly 14 may also be subject to that force, and as a result the occupant positioned on the seating assembly 14 may be as well. In response to the force, the seat back 18 is configured to shift in a vehicle-rearward and/or downward direction, indicated by the arrow in FIG. 7. The bracket 26 is also configured to shift and/or rotate in the vehicle-rearward and/or downward direction with the seat back 18. In other words, the seat back 18 and the bracket 26 may move as a single unit in a backwards (e.g., vehicle-rearwards) and/or downwards direction in response to a force acting on the vehicle 10. As the seat back 18 and the bracket 26 move, force may be transferred to the fastener 34 and the deformable spacer 38, both positioned in the opening 30 of the lower vehicle-rearward portion 106 of the bracket 26. As the seat back 18 and/or bracket 26 move backwards and/or downwards, a linear force is transferred to a top portion 242 of the deformable spacer 38. When the force acting on the deformable spacer 38 reaches a pre-determined force threshold, the deformable spacer 38 deforms, as depicted in FIG. 8B. In other words, the deformable spacer 38 deforms in response to the pre-determined force acting on the deformable spacer 38. As such, the deformable spacer 38 is altered from a non-deformed state, as shown in FIG. 8A, to a deformed state, as shown in FIG. 8B. The pre-determined force acting on the deformable spacer 38 may be in a range of from approximately 400 N to approximately 600 N. However, it is contemplated that the deformable spacer 38 may be configured to deform to any pre-determined force acting on the deformable spacer 38. The deformation of the deformable spacer 38 may provide for dissipation of the force acting on the deformable spacer 38 and/or the seating assembly 14.

In various examples, there may be cascading deformation of the deformable spacer 38.

The top portion 242 of the deformable spacer 38 may deform and dissipate energy such that adjacent portions of the deformable spacer 38 (e.g., lateral and/or bottom portions) may not deform and/or may deform to a lesser extent than the top portion 242. As such, the force being asserted on the adjacent portions of the deformable spacer 38 may not meet the threshold that causes the deformable spacer 38 to deform.

Use of the present disclosure may provide for a variety of benefits. First, conventional vehicle seats often include welded nut-and-bolt assemblies to provide for rigidity in the seat joint. The welded nut-and-bolt assembly causes impact energy on the vehicle seat to be transferred to the seat occupant. Use of the deformable spacer 38 can minimize and/or eliminate forces transferred to the seating assemblies and occupants on the seating assemblies 14. The deformable spacer 38 may operate to dissipate force acting on the seating assembly 14 by deforming to reduce and/or eliminate the force that is transferred to the occupant. Second, once impact energy acts upon conventional vehicle seats, the rigidity of the structure leads to damaged and/or broken seat components that must be replaced before an occupant can re-use the vehicle seat. The deformable spacer 38 may dissipate the force acting on the seating assembly 14 such that damage to other components of the seating assembly 14 is reduced and/or eliminated. As such, the deformable spacer 38 may prevent and/or minimize damage to other components of the seating assembly 14. In other words, the other components of the seating assembly 14 may be re-used after the deformable spacer 38 is replaced, which may reduce costs of replacing larger and/or costlier components of the seating assembly 14.

According to various examples, a vehicle may include a vehicle seating assembly including a seat back and a seat base. A bracket may couple the seat base to the seat back, wherein the bracket may define an opening. A fastener retains the bracket to the seat base via the opening. A deformable spacer is positioned about the fastener and within the opening, wherein the deformable spacer is configured to deform in response to a pre-determined force. Embodiments of the present disclosure may include one or a combination of the following features:

- the deformable spacer includes an outer wall defining an interior channel, the outer wall having a protrusion extending from an inner surface of the outer wall into the interior channel;
- the protrusion deforms in response to the pre-determined force;
- the deformable spacer includes a projection extending from an outer surface of an outer wall of the deformable spacer;
- an outer wall of the deformable spacer defines an inner aperture;
- the outer wall deforms proximate the inner aperture in response to the pre-determined force;
- the outer wall defines an interior channel for receiving the fastener;
- the projection deforms in response to a pre-determined force;
- the deformable spacer includes multiple projections in a range of from approximately four projections to approximately eight projections;
- the projection defines an interior cavity;
- the fastener is a nut and bolt assembly;
- wherein the deformable spacer extends from a head of the bolt to an outer surface of the nut;
- an outer portion of the outer wall of the deformable spacer is configured to deform into the inner aperture in response to a pre-determined force;
- the inner aperture extends from a first surface of the deformable spacer to a second surface of the deformable spacer;
- the deformable spacer includes multiple inner apertures in a range of from approximately two inner apertures to approximately six inner apertures;
- the pre-determined force is in a range of from approximately 400 N to approximately 600 N; and
- the inner aperture forms an arcuate shape within the outer wall of the deformable spacer.

Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims, as interpreted according to the principles of patent law, including the doctrine of equivalents.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. A vehicle, comprising:
a vehicle seating assembly including a seat back and a seat base;
a bracket coupling the seat base to the seat back, wherein the bracket defines an opening;
a fastener retaining the bracket to the seat base via the opening; and
a deformable spacer positioned about the fastener and within the opening, wherein the deformable spacer is configured to deform in response to a pre-determined force, wherein the deformable spacer includes a projection extending outwards from the fastener, and wherein the projection defines a gap with the fastener.

2. The vehicle of claim 1, wherein the deformable spacer includes an outer wall defining an interior channel.

3. The vehicle of claim 1, wherein the projection is configured to deform into the gap in response to the pre-determined force.

4. The vehicle of claim 1, wherein the deformable spacer includes an abutment portion adjacent to the projection.

5. The vehicle of claim 1, wherein the pre-determined force is in a range of from approximately 400 N to approximately 600 N.

6. The vehicle of claim 1, wherein the deformable spacer includes multiple projections extending outward from the fastener.

7. The vehicle of claim 6, wherein tunnels are defined between the bracket and adjacent projections.

8. A vehicle seating assembly, comprising:
a seat back;
a seat base coupled to the seat back via a bracket;
a fastener retaining the bracket to the seat base; and
a deformable spacer positioned about the fastener, wherein the deformable spacer includes a projection extending radially outwards from an outer wall.

9. The vehicle seating assembly of claim 8, wherein the outer wall defines an interior channel for receiving the fastener.

10. The vehicle seating assembly of claim 8, wherein the projection deforms in response to a pre-determined force.

11. The vehicle seating assembly of claim 8, wherein the deformable spacer includes multiple projections in a range of from approximately four projections to approximately eight projections.

12. The vehicle seating assembly of claim 8, wherein the projection defines an interior cavity.

13. The vehicle seating assembly of claim 8, wherein the fastener is a nut and bolt assembly.

14. The vehicle seating assembly of claim 13, wherein the deformable spacer extends from a head of the bolt to an outer surface of the nut.

15. A vehicle seating assembly, comprising:
a seat back;
a seat base coupled to the seat back via a bracket;
a fastener retaining the bracket to the seat base; and
a deformable spacer positioned about a perimeter of the fastener, wherein the deformable spacer defines an interior channel and an inner aperture, and wherein an outer portion of an outer wall of the deformable spacer is configured to deform into the inner aperture in response to a pre-determined force.

16. The vehicle seating assembly of claim 15, wherein the inner aperture extends from a first surface of the deformable spacer to a second surface of the deformable spacer.

17. The vehicle seating assembly of claim 15, wherein the deformable spacer includes multiple inner apertures in a range of from approximately two inner apertures to approximately six inner apertures.

18. The vehicle seating assembly of claim 15, wherein the pre-determined force is in a range of from approximately 400 N to approximately 600 N.

19. The vehicle seating assembly of claim 15, wherein the inner aperture forms an arcuate shape within the outer wall of the deformable spacer.

20. The vehicle seating assembly of claim 17, wherein the multiple inner apertures are disposed at intervals around the outer wall.

\* \* \* \* \*